US012465970B2

(12) United States Patent
Manfredi

(10) Patent No.: US 12,465,970 B2
(45) Date of Patent: Nov. 11, 2025

(54) UPGRADED ABUTMENT BENCH

(71) Applicant: Car Bench S.P.A., Massa (IT)

(72) Inventor: Lorenzo Federico Michael Manfredi, Massa (IT)

(73) Assignee: Car Bench S.P.A., Massa (IT)

( * ) Notice: Subject to any disclaimer, the term of this patent is extended or adjusted under 35 U.S.C. 154(b) by 0 days.

(21) Appl. No.: 18/698,376

(22) PCT Filed: Oct. 5, 2022

(86) PCT No.: PCT/IB2022/059509
§ 371 (c)(1),
(2) Date: Apr. 4, 2024

(87) PCT Pub. No.: WO2023/057924
PCT Pub. Date: Apr. 13, 2023

(65) Prior Publication Data
US 2024/0399441 A1    Dec. 5, 2024

(30) Foreign Application Priority Data

Oct. 6, 2021  (IT) .......................... 102021000026537

(51) Int. Cl.
*B21D 53/26* (2006.01)
*G01B 11/275* (2006.01)

(52) U.S. Cl.
CPC .......... *B21D 53/26* (2013.01); *G01B 11/2755* (2013.01)

(58) Field of Classification Search
CPC ....... B21D 53/26; B21D 1/14; G01B 11/2755
See application file for complete search history.

(56) References Cited

U.S. PATENT DOCUMENTS 3,409,990 A   11/1968   Vorpahl
4,643,015 A   2/1987   Larson et al.
4,845,974 A   7/1989   Bergstrom
(Continued)

FOREIGN PATENT DOCUMENTS

EP   1831641   9/2007

OTHER PUBLICATIONS

International Search Report and the Written Opinion Dated Jan. 11, 2023 From the International Searching Authority Re. Application No. PCT/IB2022/059509. (11 Pages).

*Primary Examiner* — Lawrence Averick

(57) ABSTRACT

The upgraded abutment bench (1) comprises:
 one horizontal flatbed (2) intended to support one crashed motor vehicle comprising a plurality of modular base platforms (3);
 repair means (5, 6, 7) for repairing a damaged chassis of the crashed motor vehicle;
 lifting/lowering means (10) associated with the horizontal flatbed (2) and positioned resting on the ground;
 one measuring system (13) adapted to measure the wheel alignment of the crashed motor vehicle comprising a plurality of measuring plates (14) which can be rotated locked together with one wheel of the crashed motor vehicle arranged thereon, each of the measuring plates (14) being associated with a respective base platform (3) to define, with the latter, a wheel alignment platform (15);
 one stabilization assembly (20) associated with each of the wheel alignment platforms (15) and adapted to stabilize the wheel alignment platforms (15) resting on the ground.

19 Claims, 3 Drawing Sheets

(56) References Cited

U.S. PATENT DOCUMENTS

| | | | |
|---|---|---|---|
| 5,809,658 A * | 9/1998 | Jackson | G01B 11/2755 33/203.18 |
| 6,532,673 B2 | 3/2003 | Jahn et al. | |
| 7,369,222 B2 | 5/2008 | Jackson et al. | |
| 10,724,855 B2 * | 7/2020 | Kroll | G01B 11/2755 |
| 2008/0119978 A1 * | 5/2008 | Stieff | G01B 11/2755 701/31.4 |
| 2018/0321029 A1 * | 11/2018 | Kroll | G01B 11/2755 |

* cited by examiner

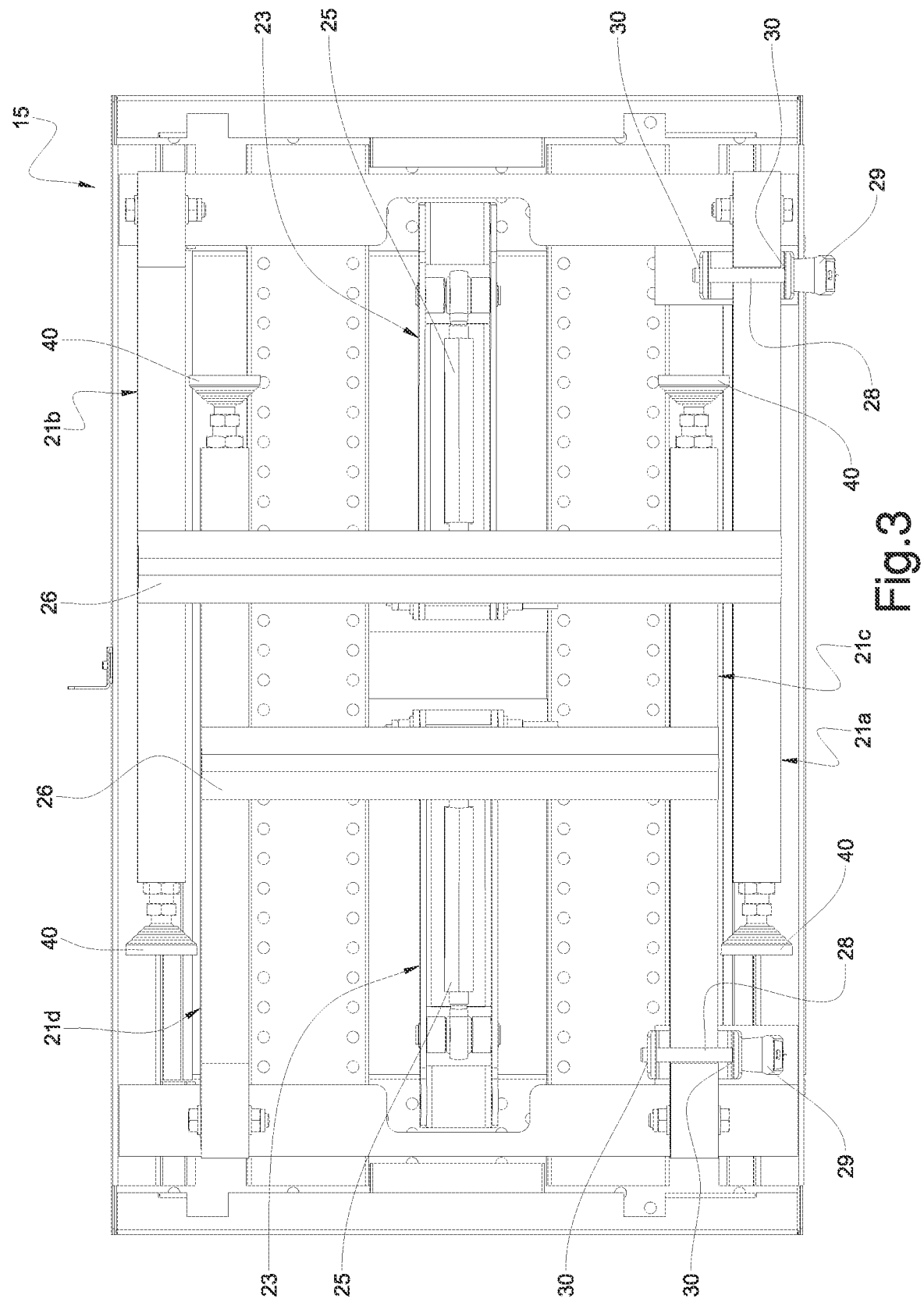

UPGRADED ABUTMENT BENCH

RELATED APPLICATIONS

This application is a National Phase of PCT Patent Application No. PCT/IB2022/059509 having International filing date of Oct. 5, 2022, which claims the benefit of priority of Italy Patent Application No. 102021000026537 filed on Oct. 6, 2021. The contents of the above applications are all incorporated by reference as if fully set forth herein in their entirety.

FIELD AND BACKGROUND OF THE INVENTION

The present invention relates to an upgraded abutment bench to carry out repair jobs on crashed motor vehicles.

As is well known, the chassis of modern motor vehicles is constructed in such a way as to absorb some of the energy produced by the shocks to which the vehicle is subjected.

Precisely, the geometry and structure of the chassis define special areas, called "absorption areas", specially designed to deform and crush during an accident to safeguard, precisely by virtue of their compression, the health of the motor vehicle's passengers.

In order to ensure that the chassis continues to carry out this protective function also following an accident, however, it is necessary for it to regain at least part of its original shape and, specifically, for some of its reference points to be returned to specific locations.

If the original geometry of the vehicle is not restored, in fact, the chassis would be unsuitable to withstand further shocks and would not offer sufficient support as a result of the latter.

In other words, the chassis would transfer dangerously high amounts of energy to the passengers in the motor vehicle in the event of a collision.

In this regard, therefore, the use of abutment benches, also called "template benches" in some cases, is well known.

These benches are specially constructed to straighten the chassis, bringing it back into alignment, as a result of an impact such that it has been at least partly deformed.

To be precise, abutment benches are composed, in their most traditional form, of a horizontal flatbed on which the motor vehicle is to be lifted and repair means of the damaged chassis comprising at least detecting means of the reference points.

That said, there is an increasing need to carry out, along with the chassis repair, works aimed at adjusting, correcting and fixing other parts of the crashed motor vehicle, such as e.g. the wheel alignment.

It is, in fact, easy to appreciate that the wheels of a motor vehicle may lose their alignment as a result of a traffic accident and that, therefore, it is convenient to adjust the geometric angles thereof as well.

In this sense, it is specified that the term "geometric angle" refers to one of the toe, camber or incidence of the wheels of a motor vehicle, and that, in particular, "camber" means the measurement of the angle between the vertical from the ground and the centerline plane of the wheel.

In this regard, the abutment benches are known and configured to repair the chassis and perform, in addition, the adjustment of at least one geometric angle of the wheels of the motor vehicle, such as, e.g., camber.

To fulfill the latter object, therefore, this type of abutment bench is provided with at least one measuring system adapted to measure at least one geometric angle of a motor vehicle comprising a plurality of measuring plates which are rotatable locked together with at least one steering wheel of the motor vehicle arranged to rest thereon.

Nevertheless, the latter type of abutment bench suffers from drawbacks and, therefore, is amenable to refinement.

In detail, such known abutment benches allow only rather coarse adjustments of the geometric angles of the wheels due to their instability on the ground.

This is due to the fact that the operations required to measure the geometric angles cause excessive oscillations of the horizontal flatbed which interfere with the successful completion of the measurements themselves by the measuring system.

In this regard, in fact, it should be specified that such operations require particularly high precision to be carried out properly.

In other words, traditional abutment benches are unsuitable to accurately adjust the geometric angles of the wheels of a motor vehicle.

SUMMARY OF THE INVENTION

The main aim of the present invention is to devise an upgraded abutment bench which allows repairing the chassis of a crashed motor vehicle and adjusting at least one geometric angle of its wheels accurately, efficiently and easily. Another object of the present invention is to devise an upgraded abutment bench which allows the aforementioned drawbacks of the prior art to be overcome within the framework of a simple, rational, easy and effective to use as well as affordable solution.

The aforementioned objects are achieved by this upgraded abutment bench having the characteristics of claim 1.

BRIEF DESCRIPTION OF THE SEVERAL VIEWS OF THE DRAWINGS

Other characteristics and advantages of the present invention will become more apparent from the description of a preferred, but not exclusive, embodiment of an upgraded abutment bench, illustrated by way of an indicative, yet non-limiting example, in the accompanying tables of drawings in which:

FIG. 3 is a bottom view of a wheel alignment flatbed of the bench according to the invention.

DESCRIPTION OF SPECIFIC EMBODIMENTS OF THE INVENTION

Figure 1:
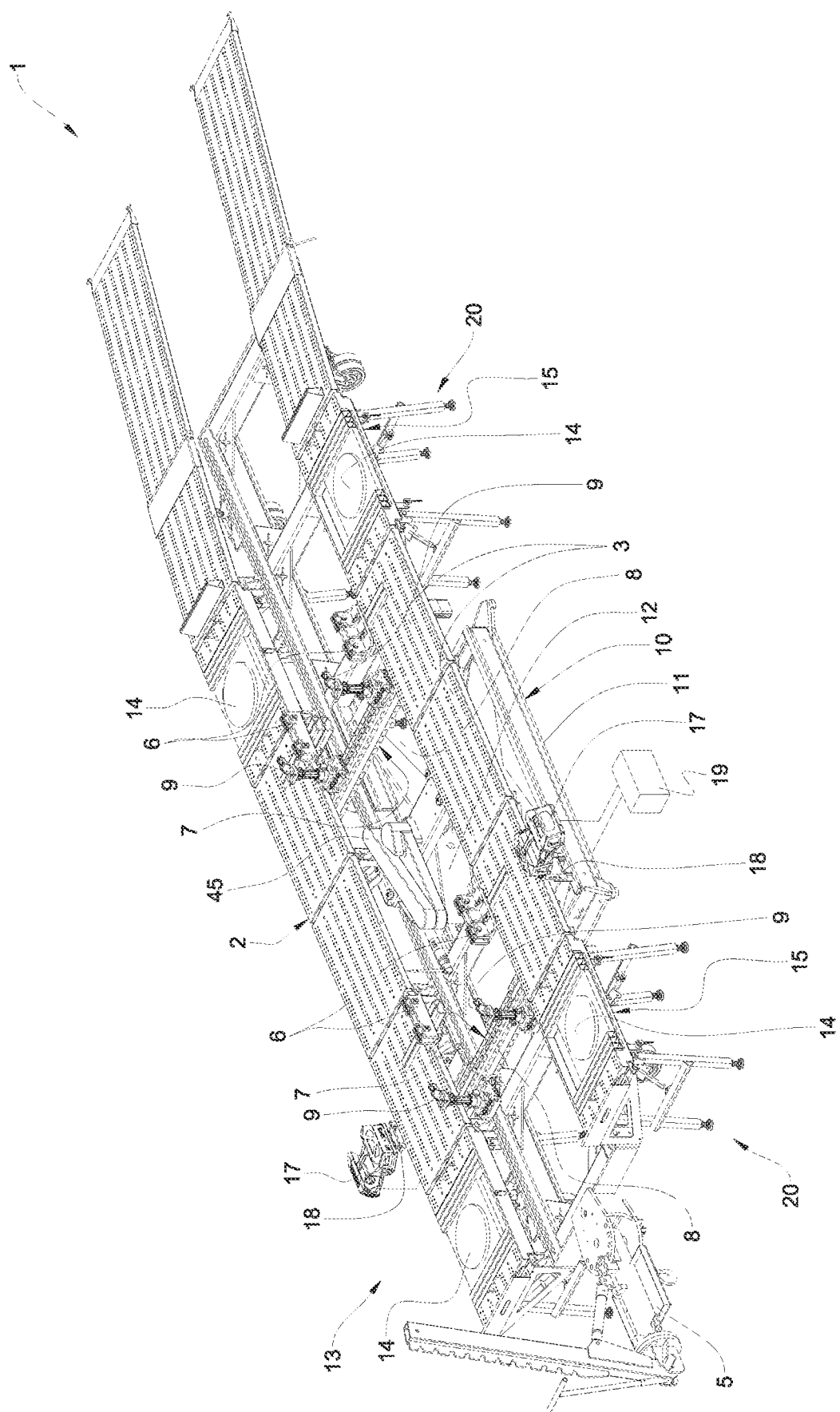
FIG. 1 is an axonometric, overall view of the bench according to the invention.

With particular reference to these figures, reference numeral 1 globally indicates an upgraded abutment bench.

The upgraded abutment bench 1 comprises at least one horizontal flatbed 2 intended to support at least one crashed motor vehicle comprising a plurality of modular base platforms 3 which are assembled together.

In particular, the base platforms 3 are substantially rectangular in shape.

In this case, the base platforms 3 are arranged aligned to each other to define at least a first row of base platforms 3 and at least a second row of base platforms 3 parallel to the first one.

In detail, the first row of base platforms 3 and the second row of base platforms 3 have substantially the same length.

In addition, the bench 1 comprises repair means 5, 6, 7 for repairing a damaged chassis of the crashed motor vehicle.

In this regard, the repair means 5, 6, 7 comprise straightening means 5 for straightening the damaged chassis of the crashed motor vehicle which are adapted to straighten the latter to bring it back into alignment.

In particular, the straightening means 5 are associated with the horizontal flatbed 2.

To be precise, the straightening means 5 are positioned between the first row of base platforms 3 and the second row of base platforms 3.

Different placements of the straightening means 5 cannot however be ruled out, such as, e.g., associated with the horizontal flatbed 2 and arranged laterally to one of the two rows of base platforms 3.

In the present case, the straightening means 5 are of the type of a pulling arm.

To enable the straightening means 5 to perform their function properly, the repair means 5, 6, 7 comprise a plurality of attachment elements 6 intended to grasp the damaged chassis of the crashed motor vehicle by attaching thereon.

Specifically, the attachment elements 6 are associated with the horizontal flatbed 2.

In this case, the attachment elements 6 are of the type of clamps and/or of anchoring points (so-called "master points").

This allows the damaged chassis to be constrained to the horizontal flatbed 2 so that the pulling force imposed on the chassis itself by the straightening means 5 will bring it back into alignment.

In combination with or as an alternative to one of the straightening means 5 or the attachment elements 6, the repair means 5, 6, 7 comprise detecting means 7 for detecting a plurality of reference points of the chassis.

It is specified, in this regard, that the expression "reference points" means a plurality of characteristic points of the chassis of a motor vehicle, the spatial location of which is of fundamental importance to ensure that the chassis itself can absorb to a good extent the energy produced by at least one impact to which the vehicle is subjected.

For this purpose, the detecting means 7 comprise at least one graduated element 8 and at least one template element 9 movable along the graduated element 8.

Specifically, the graduated element 8 is of the type of a graduated scale adapted for at least one operator to read at least one value of length.

This allows the template element 9 to be arranged in a special location intuitively and precisely.

According to a preferred embodiment, the detecting means 7 comprise a plurality of template elements 9.

Specifically, as visible in FIG. 1, the detecting means 7 comprise four template elements 9 and two graduated elements 8.

In this regard, the four template elements 9 are paired two by two, one pair of template elements 9 being movable on one graduated element 8 and the other pair of template elements 9 being movable on the other graduated element 8.

Detecting means 7 of different type from those just described cannot however be ruled out such as, e.g., detecting means 7 lacking one or more of the graduated elements 8 and/or the template elements 9.

Detecting means 7 cannot either be ruled out which are provided, in place of or in combination with one or more of the graduated elements 8 and the template elements 9, with probe arms 45 of electronic measurement of the reference points or with other devices still known to the expert in the field with which the reference points of the damaged chassis can be detected.

The bench 1 then comprises lifting/lowering means 10 associated with the horizontal flatbed 2 and positioned resting on the ground and adapted to move the horizontal flatbed 2 in the lifting/lowering direction.

Specifically, the lifting/lowering means 10 comprise at least one base portion 11 resting on the ground and at least one lifting/lowering portion 12 connected to the horizontal flatbed 2 and associated with the base portion 11, the lifting/lowering portion 12 being extendable to lift/lower the horizontal flatbed 2.

In detail, the lifting/lowering means 10 are positioned between the first row of base platforms 3 and the second row of base platforms 3.

In this regard, according to the preferred embodiment, the lifting/lowering means 10 are of the type of a scissor lift.

Lifting/lowering means 10 of different type such as, e.g., hydraulic, pneumatic, or other lifting/lowering means 10 cannot however be ruled out which allow, in all cases, the horizontal flatbed 2 to be moved in a lifting/lowering direction.

The bench 1 also comprises at least one measuring system 13 which is adapted to measure the wheel alignment of the crashed motor vehicle.

Specifically, the measuring system 13 comprises a plurality of measuring plates 14 which are rotatable locked together with at least one steering wheel of the crashed motor vehicle arranged to rest thereon.

In detail, each of the measuring plates 14 is rotatable around at least one axis of rotation arranged substantially vertically.

In other words, the measuring plates 14 promote the rotation of the steering wheel arranged resting thereon by rotating, together with it, around the substantially vertical axis of rotation.

In this regard, the measuring plates 14 are configured to measure at least one maximum steering angle.

More specifically, the measuring plates 14 are configured to measure at least one maximum steering angle in one way of wheel rotation and at least another maximum steering angle in the other way of wheel rotation.

This means that the measuring plates 14 are rotatable in both ways of rotation. Specifically, each of the measuring plates 14 is associated with a respective base platform 3 to define, with the latter, a wheel alignment platform 15.

Similarly to what has already been anticipated for the base platforms 3, the wheel alignment platforms 15 have a substantially rectangular shape.

According to the preferred embodiment, the measuring system 13 comprises four measuring plates 14, defining, with their respective base platforms 3, four wheel alignment platforms 15.

Alternative embodiments cannot however be ruled out in which, for example, the measuring system 13 comprises two measuring plates 14, defining, with their respective base platforms 3, two wheel alignment platforms 15.

For example, in this alternative embodiment, the measuring plates 14 support only the front wheels of the motor vehicle by holding them.

Advantageously, the measuring system 13 comprises at least one sensor assembly 17, 18 operatively connected to the measuring plates 14 and configured to detect, depending on the rotation of the measuring plates 14, at least one value of a geometric angle of the wheels.

It is specified, in this regard, that "geometric angle" refers to one of toe, camber and incidence of the wheels of a motor vehicle.

In this sense:
- by "toe" is meant the measurement of the angle between the axis of rotation of a wheel and the steering axle;
- by "camber" is meant the measurement of the angle between the vertical from the ground and the centerline plane of the wheel; and
- by "incidence" is meant the measurement of the angle between the vertical from the ground and the axis of constraint of the wheel.

The sensor assembly 17, 18 allows, in particular, detecting at least one value of a geometric angle of the wheels depending on at least one maximum steering angle.

In detail, the sensor assembly 17, 18 comprises a plurality of sensor devices 17, at least one sensor device 17 being placed at the point where the first row of base platforms 3 is located and at least another sensor device 17 being placed at the point where the second row of base platforms 3 is located.

Specifically, at least one of the base platforms 3 is associated with at least one supporting arm 18 of the sensor devices 17.

This allows the sensor devices 17 to be firmly attached to the base platforms 3.

In the preferred embodiment, the sensor devices 17 are of the type of optical sensors.

For example, the sensor devices 17 are of the type of optical cameras.

Thus, in this case, the sensor devices 17 are configured to operate in conjunction with at least one external device adapted to emit a coherent electromagnetic beam such as, e.g., a light beam, a laser beam or the like for detecting at least one geometric angle of the wheels.

In this regard, the bench 1 is arranged to interact with additional external devices, not shown in the drawings for simplicity sake.

For example, such external devices are of the type of calibration devices of the motor vehicle headlight, of the type of Advanced Driver Assistance Systems (ADAS) calibration devices, or other types still known to the expert in the field. The sensor assembly 17, 18 then comprises at least one electronic processing and control unit 19 operatively connected to the sensor assembly 17, 18 and provided with at least one on-screen interface viewable by at least one operator, the electronic processing and control unit 19 being configured to receive at input from the sensor assembly 17, 18 the at least one value of at least one geometric angle of the wheels and to display it on screen.

This allows an operator to read the at least one value of at least one geometric angle and to easily assess the extent of the corrections to be made to the wheels during the wheel alignment.

According to the invention, the bench 1 comprises at least one stabilization assembly 20 which is associated with each of the wheel alignment platforms 15 and is adapted to stabilize the wheel alignment platforms 15 resting on the ground.

In this case, the stabilization assembly 20 allows the weight of the wheel alignment platforms 15 to be distributed onto the ground.

In other words, the stabilization assembly 20 makes it possible to counteract the oscillations during the wheel alignment measurement carried out by the measuring system 13.

Figure 2:
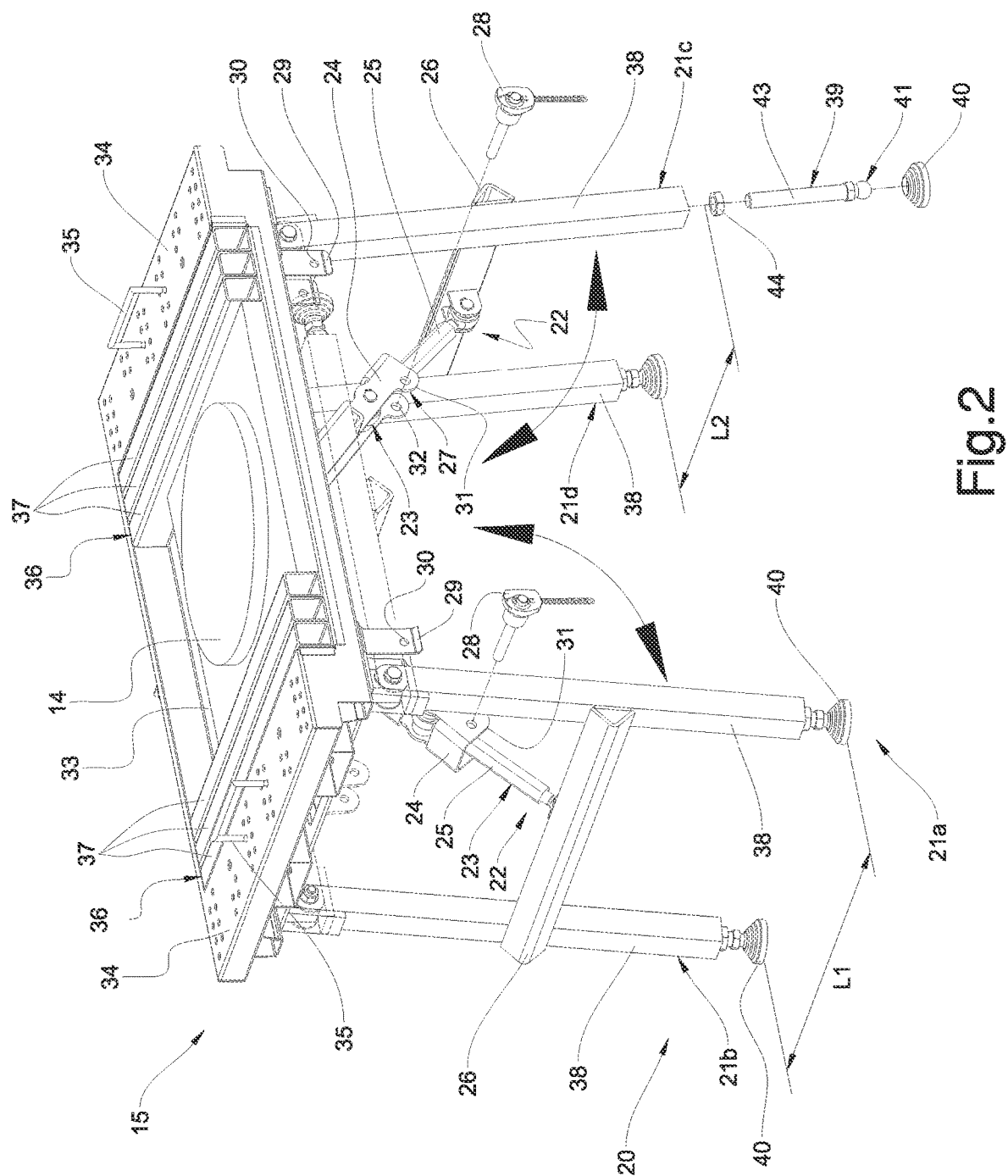
FIG. 2 is a detailed view of a wheel alignment flatbed of the bench according to the invention.

Specifically, the stabilization assembly 20 comprises a plurality of rigid stabilization bodies 21a, 21b, 21c, 21d which can rest on the ground. In this case, as visible in FIG. 2, the stabilization assembly 20 comprises four stabilization bodies 21a, 21b, 21c, 21d arranged at the point where each of the corners of the wheel alignment platforms 15 is located.

This means that each of the four wheel alignment platforms 15 is associated with four stabilization bodies 21a, 21b, 21c, 21d.

In other words, in accordance with the preferred embodiment, the stabilization assembly 20 comprises a total of sixteen stabilization bodies 21a, 21b, 21c, 21d.

Conveniently, each of the wheel alignment platforms 15 comprises opening/closing means 22 associated with the stabilization bodies 21a, 21b, 21c, 21d adapted to move the latter between at least one opening position, wherein the stabilization bodies 21a, 21b, 21c, 21d are pulled out and visible from the wheel alignment platforms 15 and are arranged resting on the ground, and at least one closing position, wherein the stabilization bodies 21a, 21b, 21c, 21d are removed from their resting on the ground and are arranged retractable on the wheel alignment platforms 15.

In detail, the opening/closing means 22 comprise a plurality of knee mechanisms 23, each of them hinged on at least one wheel alignment platform 15.

Advantageously, the knee mechanisms 23 are extendable to move the stabilization bodies 21a, 21b, 21c, 21d from the closing position to the opening position and are foldable on themselves to move the stabilization bodies 21a, 21b, 21c, 21d from the opening position to the closing position.

Specifically, each of the knee mechanisms 23 comprises at least one first bracket 24 hinged onto at least one wheel alignment platform 15 and at least one second bracket 25 associated with at least one stabilization body 21a, 21b, 21c, 21d and hinged, in turn, onto the first bracket 24.

Conveniently, the first bracket 24 is made at least partly hollow.

In the present case, the cavity of the first bracket 24 is shaped so that the second bracket 25 can be fitted inside it, at least partly, in the closing position.

The knee mechanism 23 thus allows, as a result of the connection between the first bracket 24 and the second bracket 25, arranging the second bracket 25 at least partly inside the first bracket 24 in the closing configuration, significantly reducing its overall dimensions.

Opening/closing means 22 of different type cannot however be ruled out and, in particular, provided, in place of or in combination with the knee mechanism 23, with one or more opening/closing systems of the pneumatic type and/or of the hydraulic type and/or electric type and/or other types still known to the expert in the field that enable efficient opening and closing of the stabilization bodies 21a, 21b, 21c, 21d.

Conveniently, the stabilization assembly 20 comprises at least one first stabilization body 21a and at least one second stabilization body 21b arranged on a first side and at least one third stabilization body 21c and at least one fourth stabilization body 21d arranged on a second side opposite the first one, the distance L1 between the first stabilization body 21a and the second stabilization body 21b being greater than the distance L2 between the third stabilization body 21c and the fourth stabilization body 21d.

As visible in FIG. 3, this expedient allows the stabilization bodies 21a, 21b, 21c, 21d, positioned in the closing position, to be arranged in a packed configuration which allows optimizing the available spaces and simultaneously reducing the overall dimensions along a direction transverse to the horizontal flatbed 2.

Conveniently, the stabilization bodies 21a, 21b, 21c, 21d are constrained by firmly rotating together two by two.

According to the preferred embodiment, therefore, a first pair of stabilization bodies 21a, 21b, 21c, 21d is constrained by firmly rotating together and a second pair of stabilization bodies 21a, 21b, 21c, 21d is, likewise, constrained by firmly rotating together.

In this case, the first stabilization body 21a is constrained by firmly rotating together with the second stabilization body 21b and the third stabilization body 21c is constrained by firmly rotating together with the fourth stabilization body 21d.

For this purpose, the opening/closing means 22 comprise at least one rigid connecting element 26 shaped so that it can be interposed between at least two stabilization bodies 21a, 21b, 21c, 21d to connect them together.

Specifically, each connecting element 26 is locked together with a respective second bracket 25.

This means that each wheel alignment platform 15 comprises, in accordance with the preferred embodiment, two knee mechanisms 23, each provided with a first bracket 24 and with a second bracket 25.

In addition, the opening/closing means 22 comprise stopping means 27 adapted to counteract the movement of the stabilization bodies 21a, 21b, 21c, 21d from the closing position to the opening position and vice versa.

Specifically, the stopping means 27 comprise at least one stopping element 29, 31 provided with at least one hole 30, 32 cut out through and at least one pivot element 28 insertable, at least partly, within the hole 30, 32.

In detail, the stopping means 27 comprise at least two pivot elements 28.

In this case, the stopping means 27 comprise at least a first stopping element 29 provided with at least a first hole 30 and adapted to counteract the movement of the stabilization bodies 21a, 21b, 21c, 21d from the closing position to the opening position and at least a second stopping element 31 provided with at least a second hole 32 and adapted to counteract the movement of the stabilization bodies 21a, 21b, 21c, 21d from the opening position to the closing position.

More specifically, the stopping means 27 comprise two first stopping elements 29 and two second stopping elements 31.

In detail, the first stopping elements 29 are inferiorly associated with the wheel alignment platform 15.

For example, the first stopping elements 29 are arranged in the proximity of the first stabilization body 21a and of the third stabilization body 21c, respectively, or they are arranged in the proximity of the second stabilization body 21b and of the fourth stabilization body 21d, respectively.

In the present case, the first stopping elements 29 are of the type of brackets.

Again, each of the first stopping elements 29 comprises two first aligned holes 30.

Specifically, it is sufficient to move the stabilization bodies 21a, 21b, 21c, 21d by arranging them in the closing position and, subsequently, to insert the pivot elements 28 inside the first holes 30 to counteract, due to the presence of the pivot elements themselves, the movement of the stabilization bodies 21a, 21b, 21c, 21d in the opening position.

It is emphasized that the special expedient of providing connecting elements 26 between the stabilization bodies 21a, 21b, 21c, 21d allows all stabilization bodies 21a, 21b, 21c, 21d associated with a wheel alignment platform 15 to be stopped by means of only two first stopping elements 29.

In addition, the second stopping element 31 is associated with at least one of the first brackets 24.

Specifically, each of the second stopping elements 31 comprises two second aligned holes 32.

Therefore, it is sufficient to move the stabilization bodies 21a, 21b, 21c, 21d by arranging them in the opening position and, subsequently, to insert the pivot elements 28 inside the second holes 32 to counteract, due to the presence of the pivot elements themselves, the movement of the stabilization bodies 21a, 21b, 21c, 21d in the closing position.

It is emphasized that the special expedient of providing connecting elements 26 between the stabilization bodies 21a, 21b, 21c, 21d allows all stabilization bodies 21a, 21b, 21c, 21d associated with a wheel alignment platform 15 to be stopped by means of only two second stopping elements 31.

Preferably, each of the wheel alignment platforms 15 comprises at least one positioning area 33 wherein the respective measuring plate 14 is arranged in a shiftable manner.

In addition, each of the wheel alignment platforms 15 comprises at least one transport area 34 provided with at least one transport body 35 shaped to be grasped by at least one operator for transporting the respective wheel alignment platform 15.

In the present case, each of the wheel alignment platforms 15 comprises two transport areas 34, each provided with a transport body 35.

In this regard, the transport body 35 is of the type of a handle.

Conveniently, the positioning area 33 is placed between the two transport areas 34.

Each of the wheel alignment platforms 15 also comprises positioning means 36 associated with the measuring plate 14 adapted to place the measuring plate 14 in at least one reference position.

In the present case, each of the measuring plates 14 is in the reference position when a wheel of the crashed motor vehicle can be arranged thereon.

It follows that when all four measuring plates 14 are in the reference position, each of the wheels of the crashed motor vehicle can be arranged onto a respective measuring plate 14.

This means that when all four measuring plates 14 are in the reference position, the distance between any two of the four measuring plates 14 is substantially coincident with the distance between the respective two wheels of the crashed motor vehicle.

Specifically, the positioning means 36 comprise a plurality of spacer elements 37 which can be arranged side by side and in a removable manner on each of the positioning areas 33.

In detail, the spacer elements 37 place each of the measuring plates 14 in the reference position by virtue of its own side by side positioning and arrangement. In particular, the spacer elements 37 have an elongated shape.

More precisely, the spacer elements 37 are prism-shaped.

In detail, the spacer elements 37 are prism-shaped with a square base.

In other words, the special shape of the spacer elements 37 allows them to be placed side by side in an easy and efficient manner.

It is, therefore, obvious to guess that the overall thickness of the side-by-side spacer elements 37 grows in proportion to their number.

For example, it is possible to place some spacer elements 37 between one transport area 34 and the measuring plate 14 and place the other spacer elements 37 between the other transport area 34 and the measuring plate 14 to place the latter in a well-defined position on the respective positioning area 33.

In this case, therefore, it is sufficient to displace one or more spacer elements 37, by arranging them differently, to vary, accordingly, the position of the measuring plate 14.

It is specified, in this regard, that different and/or differently shaped spacer elements 37 cannot be ruled out such as, e.g., spacer elements 37 shaped as a prism with a triangular base, or as a prism with a rectangular base, or according to other geometrical shapes still.

Conveniently, at least one of the stabilization bodies 21a, 21b, 21c, 21d comprises at least one leg 38, 39 and at least one foot 40 for resting on the ground which is associated with the leg 38, 39.

In particular, the foot 40 is at least partly hollow.

Conveniently, each leg 38, 39 comprises at least one housing 38, at least partly hollow, associated with a respective wheel alignment platform 15 and at least one leveling element 39 insertable at least partly within the housing 38.

In detail, the leveling element 39 is substantially cylindrical shaped.

In particular, the housing 38 is substantially shaped as a prism with a square base. In addition, at least one of the stabilization bodies 21a, 21b, 21c, 21d comprises at least one of either inclination adjustment means 41 for adjusting the inclination of the foot 40 with respect to the leg 38, 39 or length adjustment means 43, 44 for adjusting the length of the leg 38, 39.

In this regard, the inclination adjustment means 41 of the foot 40 comprise at least one ball joint element 41 associated with the leveling element 39.

In more detail, the ball joint element 41 is placed at least partly inside the foot 40. Specifically, the ball joint element 41 is associated with one end of the leveling element 39.

According to a preferred embodiment, the length adjustment means 43, 44 of the leg 38, 39 comprise a first threaded portion 43 formed on the leveling element 39 and at least a second threaded portion, not shown on the drawing, formed internally to the housing 38 and arranged to be coupled to the first threaded portion 43 in a threaded manner.

In more detail, the length adjustment means 43, 44 of the leg 38, 39 comprise at least one adjustment nut 44 which can be screwed onto the first threaded portion 43.

This particular expedient makes it possible to adjust the length of the legs 38, 39 and, therefore, of the relevant wheel alignment platform 15 easily and effectively by conveniently screwing the adjustment nut 44 onto the first threaded portion 43 to a desired depth and, subsequently, by screwing the first threaded portion 43 onto the second threaded portion until the adjustment nut 44 is arranged stopping against the housing 38.

Length adjustment means 43, 44 of the leg 38, 39 of different types cannot however be ruled out and, in particular, lacking the adjustment nut 44 or lacking altogether the first threaded portion 43, the second threaded portion and the adjustment nut 44.

For example, adjustment means cannot be ruled out provided with a plurality of vertically aligned through holes drilled on the housing 38 and with a corresponding plurality of vertically aligned through holes drilled on the leveling element 39 and with one or more pivots which can be inserted simultaneously through the holes on the housing 38 and through the holes on the leveling element 39 to adjust the height of the leg 38, 39.

It has in practice been ascertained that the described invention achieves the intended objects.

In particular, the fact is emphasized that the special expedient of providing an abutment bench comprising at least one stabilization assembly adapted to stabilize the wheel alignment platforms resting on the ground makes it possible to repair the chassis of a crashed motor vehicle and to adjust at least one geometric angle of its wheels accurately, efficiently and easily.

The invention claimed is:

1. Upgraded abutment bench, comprising:
    at least one horizontal flatbed intended to support at least one crashed motor vehicle comprising a plurality of modular base platforms which are assembled together;
    repair means for repairing a damaged chassis of said crashed motor vehicle comprising detecting means for detecting a plurality of reference points of said chassis;
    lifting/lowering means associated with said horizontal flatbed and positioned resting on the ground, adapted to move said horizontal flatbed in a lifting/lowering direction;
    at least one measuring system adapted to measure the wheel alignment of said crashed motor vehicle comprising a plurality of measuring plates which can be rotated locked together with at least one wheel of said crashed motor vehicle arranged thereon, each of said measuring plates being associated with a respective said base platform to define, with the latter, a wheel alignment platform;
    wherein it comprises at least one stabilization assembly which is associated with each of said wheel alignment platforms and is adapted to stabilize said wheel alignment platforms resting on the ground;
    wherein said stabilization assembly comprises at least a first stabilization body and at least a second stabilization body arranged on a first side and at least a third stabilization body and at least a fourth stabilization body arranged on a second side opposite the first one, the distance between said first stabilization body and said second stabilization body being greater than the distance between said third stabilization body and said fourth stabilization body.

2. Bench according to claim 1, wherein said wheel alignment platforms have a rectangular conformation and said stabilization bodies are arranged at the points where each of the corners of said wheel alignment platforms is located.

3. Bench according to claim 1, wherein each of said wheel alignment platforms comprises opening/closing means associated with said stabilization bodies adapted to move the latter between at least one opening position, wherein said stabilization bodies are pulled out and visible from said wheel alignment platforms and are arranged resting on the ground, and at least one closing position, wherein said stabilization bodies are removed from the ground support and are arranged retractable on said wheel alignment platforms.

4. Bench according to claim 1, wherein each of said wheel alignment platforms comprises:
    at least one positioning area wherein the respective said measuring plate is arranged in a shiftable manner;
    positioning means associated with said measuring plate adapted to place said measuring plate in at least one reference position.

5. Bench according to claim 4, wherein said positioning means comprise a plurality of spacer elements which can be arranged side by side and in a removable manner on each of said positioning areas, said spacer elements placing each of said measuring plates in said reference position by virtue of its own side by side positioning and arrangement.

6. Bench according to claim 1, wherein said measuring system comprises:
at least one sensor assembly operatively connected to said measuring plates configured to detect, depending on the rotation of said measuring plates, at least one value of at least one geometric angle of the wheels; and
at least one electronic processing and control unit operatively connected to said sensor assembly and provided with at least one on-screen interface viewable by at least one operator, said electronic processing and control unit being configured to receive at input from said sensor assembly said at least one value of a geometric angle of the wheels and to display it on screen.

7. Upgraded abutment bench, comprising:
at least one horizontal flatbed intended to support at least one crashed motor vehicle comprising a plurality of modular base platforms which are assembled together;
repair means for repairing a damaged chassis of said crashed motor vehicle comprising detecting means for detecting a plurality of reference points of said chassis;
lifting/lowering means associated with said horizontal flatbed and positioned resting on the ground, adapted to move said horizontal flatbed in a lifting/lowering direction;
at least one measuring system adapted to measure the wheel alignment of said crashed motor vehicle comprising a plurality of measuring plates which can be rotated locked together with at least one wheel of said crashed motor vehicle arranged thereon, each of said measuring plates being associated with a respective said base platform to define, with the latter, a wheel alignment platform;
wherein it comprises at least one stabilization assembly which is associated with each of said wheel alignment platforms and is adapted to stabilize said wheel alignment platforms resting on the ground;
wherein said stabilization assembly comprises a plurality of rigid stabilization bodies which can be resting on the ground;
wherein each of said wheel alignment platforms comprises opening/closing means associated with said stabilization bodies adapted to move the latter between at least one opening position, wherein said stabilization bodies are pulled out and visible from said wheel alignment platforms and are arranged resting on the ground, and at least one closing position, wherein said stabilization bodies are removed from the ground support and are arranged retractable on said wheel alignment platforms;
wherein said opening/closing means comprise a plurality of knee mechanisms, each of them hinged on at least one of said wheel alignment platforms, said knee mechanisms being extendable to move said stabilization bodies from said closing position to said opening position and being foldable on themselves to move said stabilization bodies from said opening position to said closing position.

8. Bench according to claim 7, wherein said wheel alignment platforms have a rectangular conformation and that said stabilization assembly comprises four of said stabilization bodies arranged at the points where each of the corners of said wheel alignment platforms is located.

9. Bench according to claim 7, wherein said stabilization assembly comprises at least a first stabilization body and at least a second stabilization body arranged on a first side and at least a third stabilization body and at least a fourth stabilization body arranged on a second side opposite the first one, the distance between said first stabilization body and said second stabilization body being greater than the distance between said third stabilization body and said fourth stabilization body.

10. Bench according to claim 7, wherein each of said wheel alignment platforms comprises:
at least one positioning area wherein the respective said measuring plate is arranged in a shiftable manner;
positioning means associated with said measuring plate adapted to place said measuring plate in at least one reference position.

11. Bench according to claim 10, wherein said positioning means comprise a plurality of spacer elements which can be arranged side by side and in a removable manner on each of said positioning areas, said spacer elements placing each of said measuring plates in said reference position by virtue of its own side by side positioning and arrangement.

12. Bench according to claim 7, wherein said measuring system comprises:
at least one sensor assembly operatively connected to said measuring plates configured to detect, depending on the rotation of said measuring plates, at least one value of at least one geometric angle of the wheels; and
at least one electronic processing and control unit operatively connected to said sensor assembly and provided with at least one on-screen interface viewable by at least one operator, said electronic processing and control unit being configured to receive at input from said sensor assembly said at least one value of a geometric angle of the wheels and to display it on screen.

13. Upgraded abutment bench, comprising:
at least one horizontal flatbed intended to support at least one crashed motor vehicle comprising a plurality of modular base platforms which are assembled together;
repair means for repairing a damaged chassis of said crashed motor vehicle comprising detecting means for detecting a plurality of reference points of said chassis;
lifting/lowering means associated with said horizontal flatbed and positioned resting on the ground, adapted to move said horizontal flatbed in a lifting/lowering direction;
at least one measuring system adapted to measure the wheel alignment of said crashed motor vehicle comprising a plurality of measuring plates which can be rotated locked together with at least one wheel of said crashed motor vehicle arranged thereon, each of said measuring plates being associated with a respective said base platform to define, with the latter, a wheel alignment platform;
wherein it comprises at least one stabilization assembly which is associated with each of said wheel alignment platforms and is adapted to stabilize said wheel alignment platforms resting on the ground;
wherein said stabilization assembly comprises a plurality of rigid stabilization bodies which can be resting on the ground;
wherein at least one of said stabilization bodies comprises:
at least one leg;
at least one foot for resting on the ground which is associated with said leg; and
at least one of either:

inclination adjustment means for adjusting the inclination of said foot with respect to said leg;
length adjustment means for adjusting the length of said leg.

14. Bench according to claim 13, wherein said wheel alignment platforms have a rectangular conformation and that said stabilization assembly comprises four of said stabilization bodies arranged at the points where each of the corners of said wheel alignment platforms is located.

15. Bench according to claim 13, wherein said stabilization assembly comprises at least a first stabilization body and at least a second stabilization body arranged on a first side and at least a third stabilization body and at least a fourth stabilization body arranged on a second side opposite the first one, the distance between said first stabilization body and said second stabilization body being greater than the distance between said third stabilization body and said fourth stabilization body.

16. Bench according to claim 13, wherein each of said wheel alignment platforms comprises opening/closing means associated with said stabilization bodies adapted to move the latter between at least one opening position, wherein said stabilization bodies are pulled out and visible from said wheel alignment platforms and are arranged resting on the ground, and at least one closing position, wherein said stabilization bodies are removed from the ground support and are arranged retractable on said wheel alignment platforms.

17. Bench according to claim 13, wherein each of said wheel alignment platforms comprises:
at least one positioning area wherein the respective said measuring plate is arranged in a shiftable manner;
positioning means associated with said measuring plate adapted to place said measuring plate in at least one reference position.

18. Bench according to claim 17, wherein said positioning means comprise a plurality of spacer elements which can be arranged side by side and in a removable manner on each of said positioning areas, said spacer elements placing each of said measuring plates in said reference position by virtue of its own side by side positioning and arrangement.

19. Bench according to claim 13, wherein said measuring system comprises:
at least one sensor assembly operatively connected to said measuring plates configured to detect, depending on the rotation of said measuring plates, at least one value of at least one geometric angle of the wheels; and
at least one electronic processing and control unit operatively connected to said sensor assembly and provided with at least one on-screen interface viewable by at least one operator, said electronic processing and control unit being configured to receive at input from said sensor assembly said at least one value of a geometric angle of the wheels and to display it on screen.

* * * * *